(12) United States Patent
Manduley et al.

(10) Patent No.: US 6,584,113 B1
(45) Date of Patent: Jun. 24, 2003

(54) DATA TRANSFER MODULE AND SYSTEM USING SAME

(75) Inventors: Flavio M. Manduley, Woodbury, CT (US); Daniel F. Dlugos, Huntington, CT (US); David L. Rich, Shelton, CT (US); Stephen J. Sabulis, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/470,585

(22) Filed: Dec. 22, 1999

(51) Int. Cl.[7] .................................................. H04J 3/17
(52) U.S. Cl. ..................................................... 370/433
(58) Field of Search ................................. 370/431, 433, 370/345, 336–340, 355, 402, 449, 260, 230, 389, 253, 351, 360, 377, 432–435, 215; 709/200–202, 219; 455/455, 524, 464, 414–415, 411, 511, 403–410, 419–422; 345/161

(56) References Cited

U.S. PATENT DOCUMENTS

| | | | |
|---|---|---|---|
| 4,106,092 A | 8/1978 | Millers, II .................. 364/200 |
| 4,275,385 A | 6/1981 | White ......................... 340/312 |
| 4,926,325 A | * 5/1990 | Benton et al. ................. 705/39 |
| 5,025,383 A | 6/1991 | Haines et al. ........... 364/464.03 |
| 5,305,384 A | 4/1994 | Ashby et al. ................. 380/29 |
| 5,425,051 A | 6/1995 | Mahany ....................... 375/202 |
| 5,673,308 A | * 9/1997 | Akhavan ...................... 455/461 |
| 5,687,194 A | 11/1997 | Paneth et al. ................. 375/283 |
| 5,925,101 A | * 7/1999 | Bayless et al. ............... 709/219 |
| 6,038,678 A | 3/2000 | Fukushima et al. ............ 714/4 |
| 6,161,134 A | * 12/2000 | Wang ........................... 709/220 |
| 6,208,864 B1 | * 3/2001 | Agrawal et al. ............. 455/455 |

* cited by examiner

Primary Examiner—Kwang Bin Yao
Assistant Examiner—Prenell Jones
(74) Attorney, Agent, or Firm—Ronald Reichman; Angelo N. Chaclas

(57) ABSTRACT

A system for facilitating communication between customer equipment modules and a third party equipment module through use of the data transfer module is described. The data transfer module includes a communication port for communicating with the third party equipment module, as well as ports and a connector for communicating with customer equipment modules. The data transfer module is portable and allows for the transfer of information to and from itself and any customer equipment module while disconnected from the third party equipment module and, likewise, information can be transferred between the data transfer module and the third party equipment module while disconnected from the customer equipment modules. This portability and ability to transfer information to the customer equipment modules without simultaneous communication to the third party equipment module facilitates use of the system when customer equipment modules are not easily accessible to external communication sources.

32 Claims, 4 Drawing Sheets

DATA TRANSFER MODULE AND SYSTEM USING SAME

CROSS REFERENCE TO RELATED APPLICATION

Reference is made to commonly assigned copending patent application Ser. No. 09/470,730 filed herewith entitled "METHOD AND APPARATUS FOR TELECOMMUNICATIONS SIGNAL ROUTING AND DATA MANAGEMENT in the names of Daniel F. Dlugos, Flavio M. Manduley, David L. Rich, and Stephen J. Sabulis.

TECHNICAL FIELD

The present invention relates to data transfer modules and associated systems using such modules, particularly data transfer modules which provide a portable interface between customer equipment modules and third party equipment modules.

BACKGROUND OF THE INVENTION

In many commercial applications, there is a need to be able to remotely diagnose, update, charge and retrieve information from customer equipment modules which perform a particular function or which perform multiple functions. For instance, a postal scale is one type of customer equipment module that, from time to time, may require postage rate updates so that the postage displayed for a particular mail piece can be determined based upon the weight of that mail piece. Similarly, such a postal scale, from time to time, may need servicing and the ability to remotely diagnose the condition of the scale is useful for such purpose. In other cases, equipment may have to be updated or totally changed. Other customer equipment modules which can benefit from remote access are mailing machines, copiers, facsimile machines, paper inserters, data capturing devices and any other type of equipment that cannot be readily or conveniently interfaced to a communication medium.

SUMMARY OF THE INVENTION

The present invention, therefore, is directed to a data transfer module which in conjunction with customer equipment modules specifically designed for use with such a data memory module, can enhance and/or change the usability and reliability of such customer equipment. Through use of the data transfer module, the customer equipment module can be updated with respect to software contained therein, diagnostics can be performed, including preventative maintenance, data capture can be performed with respect to information contained in the customer equipment; software updates can be performed with respect to the software in the customer equipment module operable to perform its various functions, and messaging can be performed for communicating with the user of the customer equipment module. A data transfer module (DTM) for use in such a system is typically a small portable device with an onboard modem interface and associated control logic. The DTM can thus be used with a customer equipment module by interfacing with that customer equipment module through an electronic interface, either through direct wiring, direct connection or remotely through radio frequency or infrared, or AC line communications and the like.

Typically, large customer equipment modules such as photocopiers, postal meters, postage mailing systems and the like are relatively large pieces of equipment which may not be easily accessible to a phone line or other communication medium. Furthermore, it is typically impractical to dedicate a phone line for each customer equipment module.

The data transfer module of the present invention therefore provides a mechanism for communicating via a modem or the like, the transfer of information between the data transfer module and a third party equipment module remotely located with respect to the customer equipment module.

BRIEF DESCRIPTION OF THE DRAWINGS

For a fuller understanding of the nature and objects of the present invention, reference should be made to the following detailed description, taken in conjunction with the following drawings in which.

DETAILED DESCRIPTION

Figure 1:
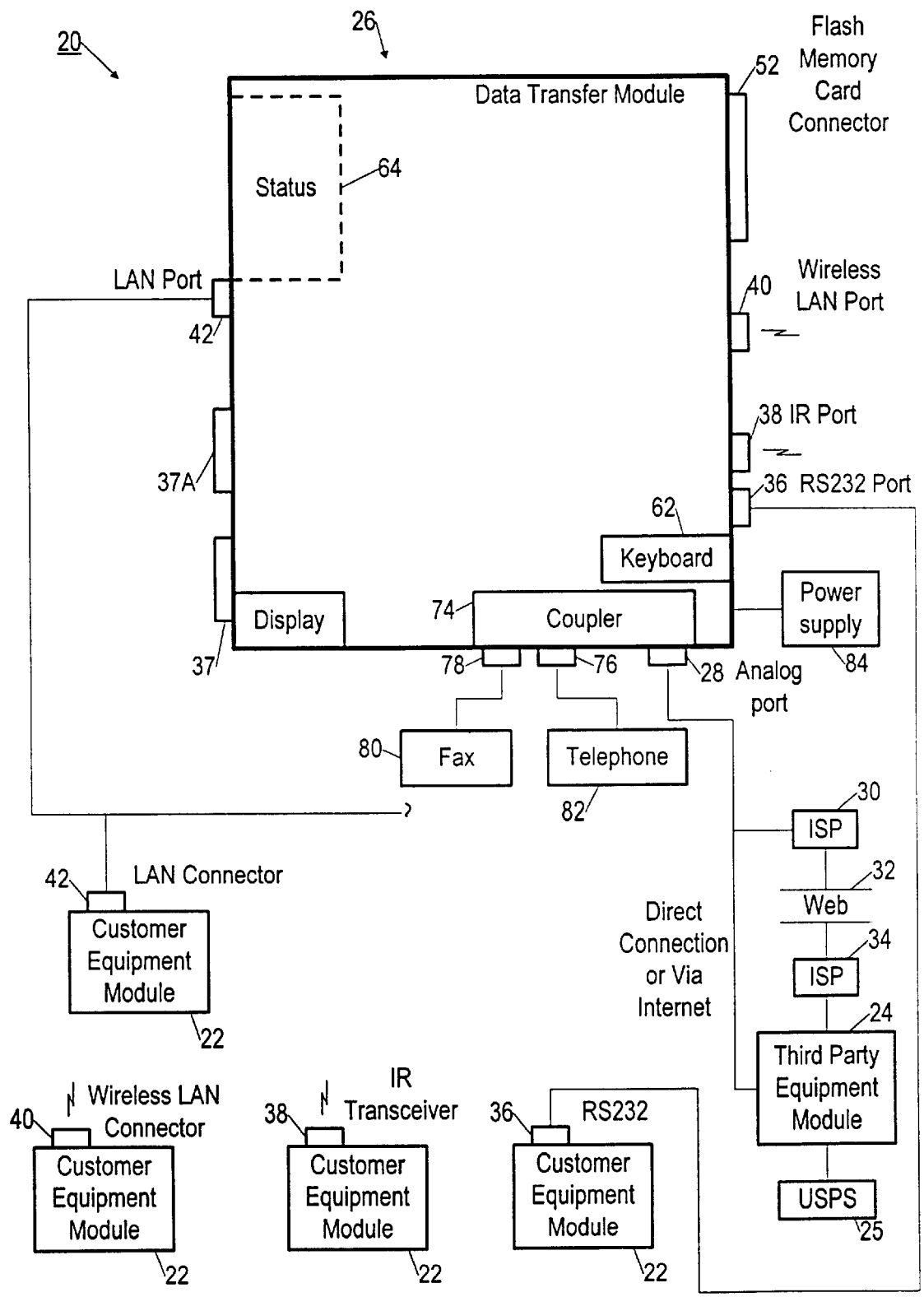
FIG. 1 is an overall block diagram of a system for communicating with various types of customer equipment modules via a data transfer module which in turn communicates with a third party equipment module.

As best seen in FIG. 1, an integrated system 20 can communicate with one or more types of customer equipment (hereinafter referred to as customer equipment modules 22) and with a third party equipment module 24 by means of a data transfer module (DTM) 26. The DTM can communicate with the third party equipment module 24 by means of a dial-up connection via telephone connector 28 or by use of the telephone connector 28 to connect to an Internet Service Provider (ISP) 30 for communication with the Internet or World Wide Web 32 and then to the third party equipment module 24 which also has Internet connection, either directly or through an associated ISP 34.

Figure 2:
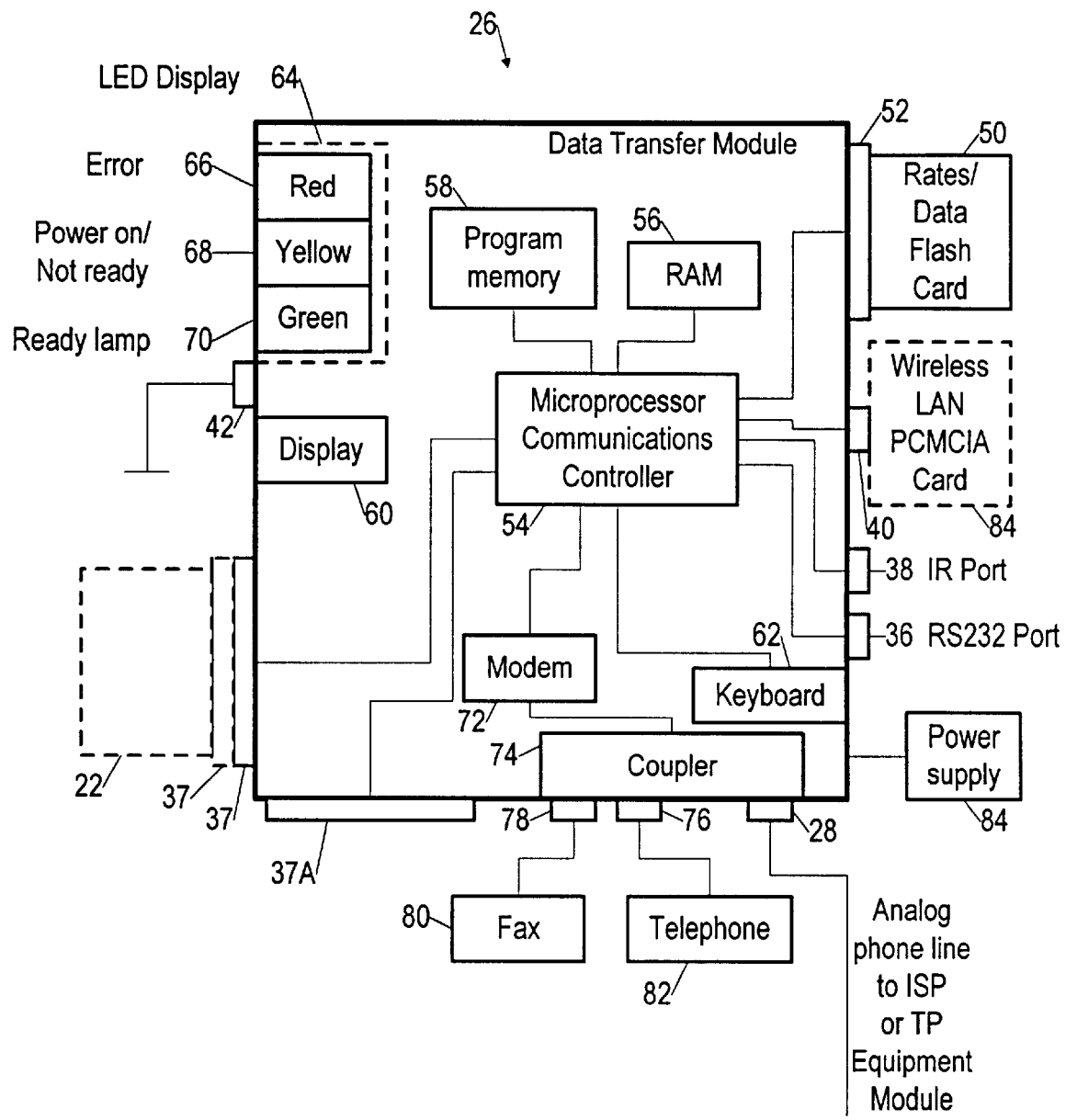
FIG. 2 is an overall block diagram of the data transfer module.
Figure 3:
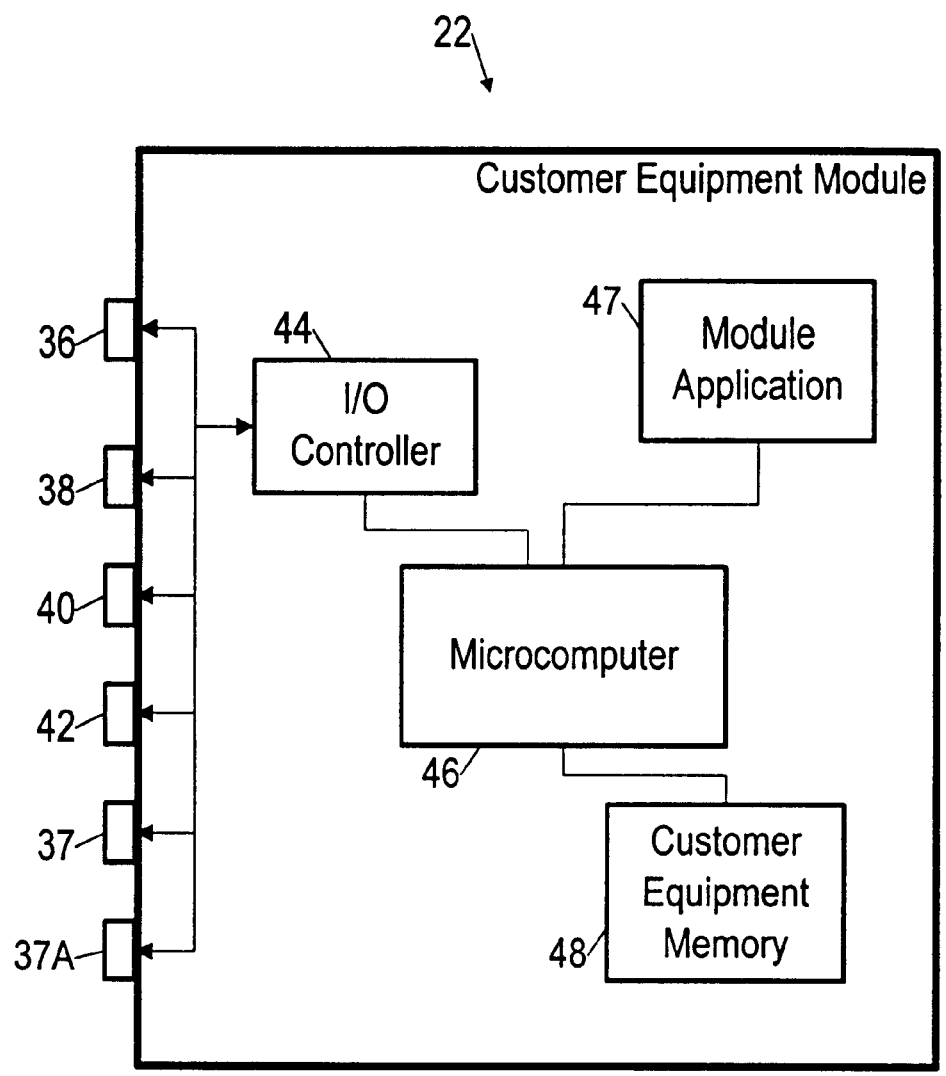
FIG. 3 is a block diagram of the memory and communications portions of a typical customer equipment module.
Figure 3A:
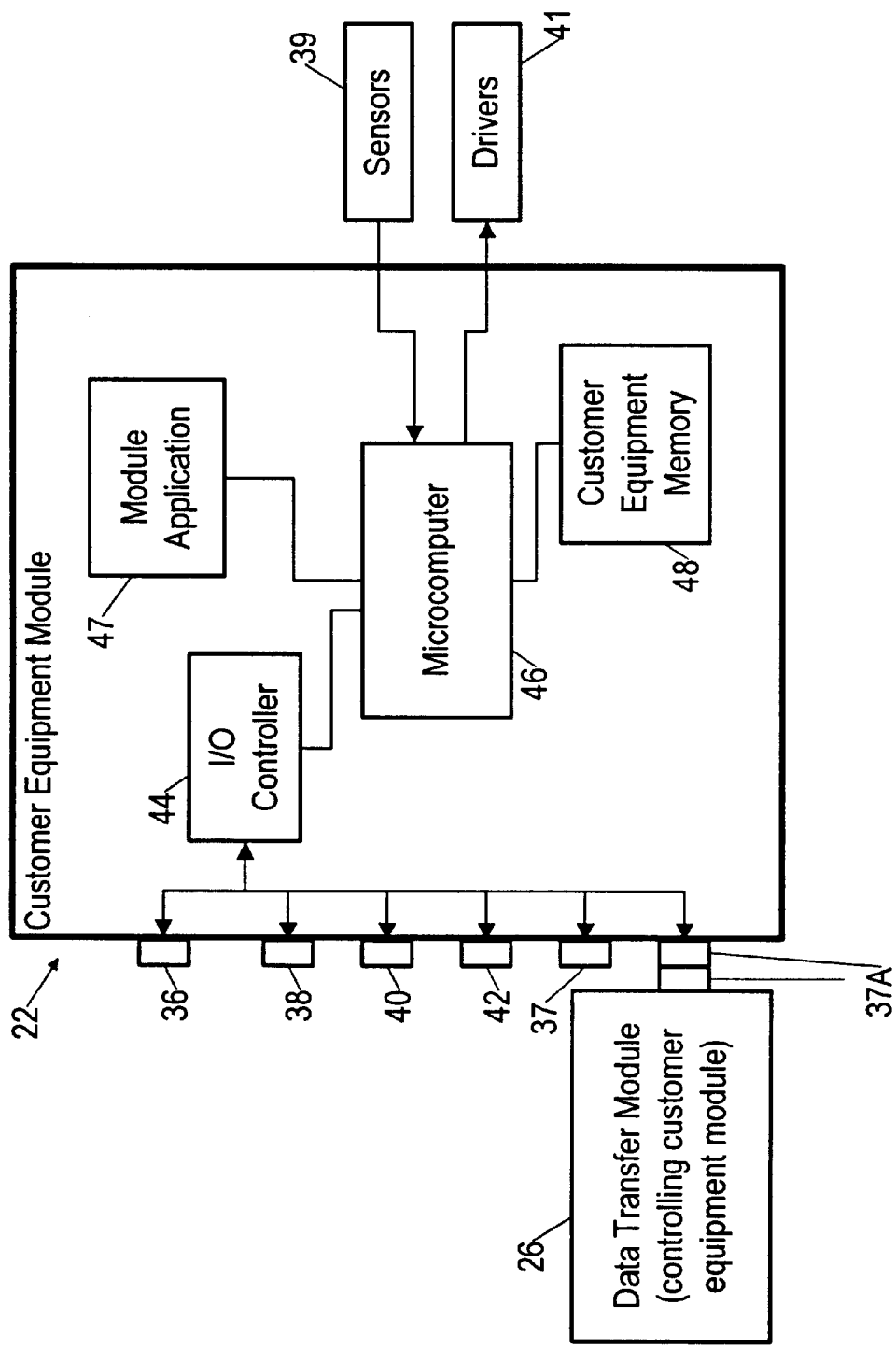
FIG. 3A is a block diagram of a customer equipment module and data transfer module, where the customer equipment module can be directly controlled by the data transfer module.

The data transfer module 26 can communicate to the customer equipment modules 22 either via direct connection such as via a connector 37 or via an RS232 serial connection port 36, or can communicate via an infrared transceiver port 38, via a wireless local area network (LAN) port 40, or via a traditional wired local area network (LAN) port 42. Of course, other hardwired or wireless ports such as an AC line and protocols can be used for communicating between the data transfer module 26 and various types of customer equipment modules 22, provided that these modules have corresponding ports or connectors and associated hardware for communicating with the data transfer module 26. As seen in FIG. 3, each customer equipment module 22 includes an I/O controller 44, a microcomputer 46, and equipment memory 48 for communicating via a connector 37, via an RS232 port 36, via an infrared transceiver port 38, a wireless LAN port 40 or a wired LAN port 42, depending upon the configuration of the customer equipment module 22. Although a connector and four ports are shown in FIG. 3, typically a customer equipment module 22 would have only one or two types of ports or connector for communicating with the data transfer module 26. In addition, as seen in FIGS. 2 and 3A, a connector 37A can be provided on the data transfer module 26 and customer equipment module 22 so as to allow the customer equipment module 22 to be controlled by controller 54 in the data transfer module 26. As seen in FIG. 3A, in such a configuration, the customer equipment module microcomputer 46 receives information from sensors 39 and sends information to drivers 41. In this configuration, the data transfer module microprocessor controller 54 interacts with microcomputer 46 so as to effectively control the customer equipment module 22. This configuration is especially useful for conducting diagnostics on the customer equipment module 22.

Each customer equipment module 22 represents one of a number of different products for use at the customer location including postal scales, postal meters, mailing machines, photocopiers and tabletop inserters. For each type of module, the customer equipment module 22 performs a corresponding function, and, thus the customer Traditionally such devices, especially those which are fairly large in size, have been difficult to update with respect to rate information, application software updates and the like, and have also not been readily configurable so as to communicate with remote diagnostic centers, as well as to convey certain operating conditions for determining the extent of use with respect to the particular module. For instance, if the customer equipment module 22 is a postal scale, it is necessary from time to time to update the software modules executable by the microcontroller 46 and which are stored in the customer equipment memory 48. In addition, it may be necessary from time to time to perform diagnostics on the postal scale in which case data can be collected from the scale and transferred to a third party equipment module 24.

If the customer equipment module 22 is a postal meter, it is typically necessary to periodically update the postal rates associated for use with the postal machine. In addition, mailing machines may have Pitney Bowes Inc. Postage by Phone® capability but may not be readily accessible to a typical phone line. Therefore, it is desirable that such postal rate updating be done by way of a data transfer module 26. Other types of customer equipment modules 22, such as photocopiers, tabletop inserters and the like tend to be heavy and bulky items which are not easily movable to a telephone jack; nor is it desirable to have such a module connected to a telephone jack on a permanent basis. Thus, a data transfer module 26, according to the present invention, provides a means for communicating with such customer equipment modules 22 through the above-mentioned ports or connector, yet is itself portable and, therefore, can be moved to a telephone connector 28 within the customer's premises for communicating either directly to the third party equipment module 24 or for communicating using TCP/IP protocol to an Internet Service Provider 30 which, in turn, communicates via the Internet 32 to the associated third party equipment module 24.

Thus, the data transfer module 26 provides an intermediary mechanism for conveying information to and from customer equipment modules 22 and third party equipment modules 24 for purposes of transferring data to such customer equipment modules 22, as well as for receiving information from the customer equipment modules 22 for purposes of updating information at the third party equipment module 24 or at some further downstream location such as the U.S. Postal Service with regard to postage by phone or the like. Thus, the data transfer module 26 is integral to the overall system for updating information to and from customer equipment modules 22 with respect to third party equipment modules 24.

DATA TRANSFER MODULE

Details of the data transfer module 26 can best be seen in FIGS. 1 and 2. As there seen, the data transfer module 26 typically includes a memory connector which may be a flashcard connector 52 or other memory type such as CMOS with battery backup, for instance, which is adapted for mating with an external flashcard 50 for receipt of data which, in turn, is used for updating customer equipment modules 22 such as rate information for a postal meter module or a mailing machine module. Internally, the data transfer module 26 includes a microprocessor communications controller 54, random access memory 56, program memory 58, a display 60, a keyboard or other input entry device 62, status indicator areas 64 comprising a plurality of annunciating indicators such as light emitting diodes 66, 68 and 70, a modem 72, as well as a coupler 74 for connecting a modem to the telephone connector 28, as well as additional connectors 76 and 78 for possible connection to external devices such as a fax machine 80 or a telephone 82. In addition, the data transfer module 26 includes a connector 37, an RS232 port 36, an infrared port 38, a wireless local area network (LAN) port 40 and a hardwire LAN port 42 as previously discussed. It may also include a connector 37A for special connection to a customer equipment module 22 (via a corresponding connector 37A) for control of the customer equipment module 22.

Microprocessor 54 and its associated communications controller is responsible for communicating with the display 60, keyboard 62, modem 72, status indicators 64 and various memory modules 56 and 58, as well as the external ports 36, 38, 40 and 42, and connector 37 and 37A for communicating to both the customer equipment modules 22 and the third party equipment module 24. With respect to connector 37A, microprocessor 54 can also perform direct control of the customer equipment module 22. The wireless LAN port 40 is typically connected to a PCMCIA card 84 which generates the Ethernet protocol for communication with other wireless LAN devices.

The display 60 can be a liquid crystal display or any other type of display for communicating alpha numeric information to the user of the data transfer module 26. The data input device 62 typically has an alphanumeric keyboard and could include special keys such as a "yes" key, a "no" key, and cursor control keys and the like for inputting information to the data transfer module 26 or a touch screen display.

The flashcard memory 50 typically contains approximately 4 megabytes of information (but may contain more or less memory) sufficient to store multiple files or data with respect to communication with a customer equipment module 22. Although a flashcard 50 can be used for insertion into a data transfer module 26 for purposes of conveying this information to the module which, in turn, can convey the information to the customer equipment module 22 through one of the associated I/O ports, it is also possible that this information can be conveyed to the data transfer module 26 from the third party equipment module 24 over the Internet or directly through a dial-up connection through analog port 28, wherein this information would then be stored within a non-volatile portion of RAM memory 56. This memory can be static RAM or can be dynamic RAM with battery backup. The data transfer module 26 can communicate to the user via the associated display 60, with user input via keyboard 62. Typically the user interface conveys information to the user concerning the transfer of information to the associated third party equipment module 24 or receipt of information therefrom, as well as transfer of information to the associated customer equipment module 22 or receipt of information therefrom, depending upon mode of operation of the data transfer module 26. The status indicators 64 provide information concerning the state of the data transfer module 26 and can also be used to show the connection status for the modem when a connection is made via the modem to the third party equipment module 24.

When the data transfer module 26 is used with a postal scale, it is typically used for purposes of providing postal rate update information to the scale. The U.S. Postal Service or shipping carrier, depending upon the use of the postal scale, typically periodically updates the rate information for the services that it provides. The data transfer module 26 can receive such update information via a flashcard 50 or through information provided by the third party equipment module 24. Once this information is resident in the data transfer module 26, it can be provided to the customer equipment module 22 i.e., postal scale, by communicating between the scale and the data transfer module 26 via one of the ports 36, 38, 40 or 42. The display 60 then communicates with the user in terms of performing this communication to the postal scale and verifying that the new rate data has been transferred to the scale. In actual operation, the data transfer module 26 verifies that it is connected to a postal scale, as well as other pertinent information concerning the scale, as well as verifying that the data, in fact, has been transferred and accepted by the scale.

Another application of the data transfer module 26 is with respect to performing software updates and enhancing the functionality of associated customer equipment modules 22. The data transfer module 26 forms an integral part of the customer equipment module 22 by providing system operating software on whatever basis is required for that particular module. The software updates, therefore, can be used to update associated customer equipment software to correct for errors in previous versions, to increase the functionality of the customer equipment module 22, and to activate particular product enhancements such as accounting features, reports and the like.

As discussed above, another application is when the data transfer module 26 is used to control the customer equipment module 22 as shown in FIG. 3A. In this configuration, microcontroller 46 of the customer equipment module 22 connects to sensors 39 and drivers 41 that, in turn, communicate with microprocessor controller 54 of the data transfer module 26 which directly interacts with these sensors 39 and drivers 41.

Again, the user is provided with information on display 64 with respect to communications with the specific customer equipment module 22 and verifying that the information, in fact, has been properly transferred to that module. Depending upon the nature of the update, security information may be required from the user and input to the data transfer module 26 by keyboard 62.

As also seen in FIGS. 1 and 2, the data transfer module 26 can also be used for purposes of updating the funds in a postal meter without connecting the postal meter to a phone line. Many postal meters today have the ability to connect to an analog telephone jack for purposes of communicating information to a central authority for purposes of increasing the amount of postage available in that postal machine. Such communications require submission of a security code as well as receipt of information for transfer to the postal meter which allows the postal meters postal storage memory areas to be increased in monetary value. The data transfer module 26 can make the connection to the central authority for purposes of identifying the postal meter, as well as receiving information from the postal authority to allow information to be transferred to the postal meter for updating the postage dollar amount available in the postal meter. This is particularly useful when a plurality of postal meters are not conveniently located to an analog phone line and in which the data transfer module 26 can then be individually connected to these postal meters through one of the associated I/O ports for purposes of updating the postage meter amount for each of the postal meters.

A further use of the data transfer module 26 is to provide product performance data for remote diagnosis and monitoring of customer equipment modules 22 such as postal meters, postal scales, tabletop inserters, photocopiers and the like. In this manner, a third party equipment module 24 can provide helpdesk support services to the customer equipment modules 22 which greatly enhances the specific product performance through use of maintaining error logs, performance histograms, determining cycle counts and the like which then are available immediately for analysis by the third party equipment module 24. Thus, the data transfer module 26, when operating in this mode, communicates with the customer equipment module 22 or modules to collect real-time product performance information such as online remote diagnostic information, alpha/beta test performance monitoring, as well as customer usage patterns, which, therefore, provide the ability to schedule more accurately preventative maintenance service calls, the automatic ordering of consumerables and the like.

Thus, what has been described is an overall system for facilitating communications between customer equipment modules of various types, including postal meters, postal scales, tabletop inserters, copiers and the like, with third party equipment for purposes of diagnosis, updating of information within the customer equipment, maintaining data logs and the like, which thereby achieves the above-mentioned desirable results through use of a data transfer module which contains a plurality of ports for communicating with the customer equipment modules, as well as facilities for communicating with the third party equipment module. The data module is portable, thereby facilitating use with customer equipment modules which are not easily accessible to communication lines, including analog phone lines. Through use of the system and the associated data transfer module, productivity of customer equipment is greatly facilitated.

Therefore, it is apparent that the objects set forth above and those made apparent from the preceding description are efficiently obtained; and, since certain changes in the above architecture and methodology can be made without departing from the scope of the invention, it is intended that all the matter contained in the above description or shown in the accompanying drawings shall be interpreted as illustrative and not in a limiting sense.

It is also understood that the following claims are intended to cover all the generic and specific features of the invention herein described, and all statements of the scope of the invention which, as a matter of language, might be said to fall in between.

What is claimed is:

1. A data transfer module for communicating information between customer equipment modules and a third party equipment module, comprising:

A) third party equipment communication means for communicating information regarding customer's equipment to and from the third party equipment modules;

B) customer equipment communication means for communicating information regarding customer's equipment to and from the customer equipment modules;

C) memory for storage of the information received from the third party equipment module and/or from the customer equipment modules; and D) a communications controller connected to the third party communication means and the customer equipment communication means, as well as to the memory means, for controlling the transfer of the information to and from the third party equipment module and the memory of the data transfer module and for transfer of the information to and from the customer equipment modules and the memory of the data transfer module;

wherein the data transfer module memory is at least partially non-volatile so that the data transfer module can sequentially communicate customer's equipment information between any customer equipment module and the third party equipment module to perform diagnostics from information received from the customer equipment communications means.

2. A data transfer module for communicating the information between customer equipment modules and a third party equipment module as defined in claim 1, wherein the data transfer module includes means for communicating with the third party equipment module while the data transfer module is not communicating with the customer equipment modules.

3. A data transfer module for communicating the information between customer equipment modules and a third party equipment module as defined in claim 1, wherein the data transfer module has means for communicating with any customer equipment module while not communicating with the third party equipment module.

4. A data transfer module for communicating the information between customer equipment modules and a third party equipment module as defined in claim 1, wherein the data transfer module includes a display and a keyboard, wherein the communications controller is also connected to the keyboard and the display for controlling the presentation of the information to the user of the data transfer module on said display and for controlling the input of user information from the keyboard to the data transfer module.

5. A data transfer module for communicating the information between customer equipment modules and a third party equipment module as defined in claim 4, wherein the data transfer module further comprises status indicators connected to communications controller for showing to the user the status of the data transfer module.

6. A data transfer module for communicating the information between customer equipment modules and a third party equipment module as defined in claim 5, wherein the data transfer module further comprises a connector port for receipt of a memory card, the memory card containing data which can be used for updating information in at least one customer equipment module.

7. A data transfer module for communicating the information between customer equipment modules and a third party equipment module as defined in claim 1, wherein the data transfer module comprises means for communicating with the global network of networks for transferring the information to the third party equipment module and for receiving information therefrom.

8. A data transfer module for communicating the information between customer equipment modules and a third party equipment module as defined in claim 1, wherein third party equipment communications means comprises a modem connected to the communications controller, the modem having an output for connection to a communications medium.

9. A data transfer module for communicating the information between customer equipment modules and a third party equipment module as defined in claim 1, wherein the customer equipment communications means includes a serial data port.

10. A data transfer module for communicating the information between customer equipment modules and a third party equipment module as defined in claim 1, wherein the customer equipment communications means includes an infrared communications port.

11. A data transfer module for communicating the information between customer equipment modules and a third party equipment module as defined in claim 1, wherein the customer equipment communications means includes a wireless local area network communications port.

12. A data transfer module for communicating the information between customer equipment modules and a third party equipment module as defined in claim 1, wherein the customer equipment communications means includes a local area network communications port.

13. A data transfer module for communicating the information between customer equipment modules and a third party equipment module as defined in claim 1, wherein the customer equipment communications means is a connector for direct connection to at least one customer equipment module.

14. A data transfer module for communicating the information between customer equipment modules and a third party equipment module as defined in claim 1, wherein the data transfer module includes means for receipt of information from an interconnectable memory device for transfer of at least a portion of said information to at least one customer equipment module.

15. A data transfer module for communicating the information between customer equipment modules and a third party equipment module as defined in claim 1, further comprising controller means coupled to the data communications controller for directly controlling a customer equipment module communicating therewith.

16. A system for communicating information between customer equipment modules and at least one third party equipment module comprising:

A) at least one customer equipment module for performing a given task, the customer equipment module including an input/output controller, at least one communication port, and a customer equipment memory and a microcontroller connected to the customer equipment memory and the input/output controller for communicating information regarding the customer's equipment to and from a data transfer module;

B) at least a third party equipment module having and a customer equipment memory and a microcomputer connected to the customer equipment memory and the input/output controller for communicating information regarding the customer's equipment to and from a data transfer module; and C) a data transfer module for communicating information between each customer equipment module and the third party equipment module, having:
1) third party equipment communication means for communicating the information to and from the third party equipment module;
2) customer equipment communication means for communicating the information to and from the customer equipment modules;

3) memory for storage of information received from the third party equipment module and/or from the customer equipment modules; and 4) a communications controller connected to the third party communication means and the customer equipment communication means, as well as to the memory means, for controlling the transfer of the information to and from the third party equipment module and the memory of the data transfer module and for transfer of information to and from the customer equipment modules and the memory of the data transfer module:

wherein the data transfer module memory is at least partially non-volatile so that the data transfer module can sequentially communicate the information between any customer equipment module and the third party equipment module to perform diagnostics from information received from the customer equipment communications means.

17. A system for communicating information between customer equipment modules and at least one third party equipment module as defined in claim 16, wherein the data transfer module includes a display and a keyboard, wherein the communications controller is also connected to the keyboard and the display for controlling the presentation of the information to the user of the data transfer module on said display and for controlling the input of user information from the keyboard to the data transfer module.

18. A system for communicating information between customer equipment modules and at least one third party equipment module as defined in claim 17, wherein the data transfer module further comprises status indicators connected to communications controller for showing to the user the status of the data transfer module.

19. A system for communicating information between customer equipment modules and at least one third party equipment module as defined in claim 18, wherein the data transfer module further comprises a connector port for receipt of a memory card, the memory card containing data which can be used for updating information in at least one customer equipment module.

20. A system for communicating information between customer equipment modules and at least one third party equipment module as defined in claim 16, wherein third party equipment communications means comprises a modem connected to the communications controller, the modem having an output for connection to a communications medium.

21. A system for communicating information between customer equipment modules and at least one third party equipment module as defined in claim 16, wherein the customer equipment communications means of the data transfer module includes a serial data port and wherein at least one customer equipment module communication port includes a serial data port.

22. A system for communicating information between customer equipment modules and at least a third party equipment module as defined in claim 16, wherein the customer equipment communications means of the data transfer module includes an infrared communications port and wherein at least one of the customer equipment module communication port includes an infrared communications port.

23. A system for communicating information between customer equipment modules and at least one third party equipment module as defined in claim 16, wherein the customer equipment communications means of the data transfer module includes a wireless local area network communications port and wherein at least one customer equipment communication port includes a wireless local area network communications port.

24. A system for communicating information between customer equipment modules and at least a third party equipment module as defined in claim 16, wherein the customer equipment communications means of the data transfer module includes a local area network communication port and wherein at least one customer equipment communication port includes a local area network port.

25. A system for communicating information between customer equipment modules and at least a third party equipment module as defined in claim 16, wherein the customer equipment communications means of the data transfer module is a connector for direct connection to at least one customer equipment module and wherein at least one customer equipment communication port is a connector for direct connection to the data transfer module connector.

26. A system for communicating information between customer equipment modules and at least a third party equipment module as defined in claim 16, further comprising controller means coupled to the data communications controller for directly controlling the customer equipment module communicating therewith.

27. The data transfer module claims in claim 1, wherein the information is software updates of software contained in the customer equipment module.

28. The data transfer module claimed in claim 27, wherein the customer equipment module is a postal meter.

29. The data transfer module claimed in claim 28, wherein the information is postal rate updates.

30. The system claimed in claim 17, wherein the information is software updates of software contained in the customer equipment module.

31. The system claimed in claim 30 wherein the customer equipment module is a postal meter.

32. The system claimed in claim 31 wherein the information is postal rate updates.

* * * * *